United States Patent
Keil et al.

(10) Patent No.: US 12,216,594 B2
(45) Date of Patent: Feb. 4, 2025

(54) READ ARBITER CIRCUIT WITH DUAL MEMORY RANK SUPPORT

(71) Applicant: Apple Inc., Cupertino, CA (US)

(72) Inventors: Shane J. Keil, San Jose, CA (US); Gregory S. Mathews, Saratoga, CA (US); Lakshmi Narasimha Murthy Nukala, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/469,905

(22) Filed: Sep. 19, 2023

(65) Prior Publication Data

US 2024/0095194 A1     Mar. 21, 2024

Related U.S. Application Data

(60) Provisional application No. 63/376,215, filed on Sep. 19, 2022.

(51) Int. Cl.
G06F 13/16     (2006.01)

(52) U.S. Cl.
CPC ...... G06F 13/1626 (2013.01); G06F 13/1678 (2013.01); G06F 13/1689 (2013.01)

(58) Field of Classification Search
CPC .... G06F 13/36; G06F 13/362; G06F 13/1626; G06F 13/1642; G06F 13/161; G06F 13/1621; G06F 13/1678; G06F 13/1689
See application file for complete search history.

(56) References Cited

U.S. PATENT DOCUMENTS

| | | | |
|---|---|---|---|
| 11,379,388 B1 | 7/2022 | Balakrishnan et al. | |
| 2009/0248994 A1* | 10/2009 | Zheng | G06F 13/28 711/E12.001 |
| 2016/0188529 A1 | 6/2016 | Nagarajan et al. | |
| 2016/0306567 A1* | 10/2016 | Yang | G06F 12/023 |
| 2020/0081652 A1* | 3/2020 | Nukala | G06F 3/0659 |
| 2021/0073152 A1 | 3/2021 | Shen et al. | |
| 2022/0058141 A1 | 2/2022 | Magro et al. | |
| 2022/0413759 A1* | 12/2022 | Shen | G06F 3/0679 |
| 2024/0256283 A1* | 8/2024 | Fryman | G06F 15/8007 |
| 2024/0289020 A1* | 8/2024 | Yun | G06F 13/1642 |

OTHER PUBLICATIONS

Ecco, L., Kostrzewa, A., & Ernst, R. (Jul. 2016). Minimizing DRAM rank switching overhead for improved timing bounds and performance. In 2016 28th Euromicro Conference on Real-Time Systems (ECRTS) (pp. 3-13). IEEE.*

Krishnapillai, Y., Wu, Z.P., & Rodolfo P. (Jul. 2014). ROC: A Rank-switching, Open-row DRAM Controller for Time-predictable Systems. In Proceedings of the IEEE Euromicro Conference on Real-Time Systems (ECRTS), Madrid, Spain.*

* cited by examiner

*Primary Examiner* — Tracy A Warren
(74) *Attorney, Agent, or Firm* — Kowert, Hood, Munyon, Rankin & Goetzel, P.C.; Dean M. Munyon

(57) ABSTRACT

A memory control circuit coupled to multiple memory ranks may receive read and write requests for a different ranks of the multiple memory ranks. The memory control may allocate write requests to different slots based on the write requests target memory rank, and may adjust the number of slots available for a given memory rank during a write turn to improve write efficiency. The memory control circuit may also determine a number of ranks switches within a read turn based on whether a particular quality-of-service requirement associated with the read requests is being satisfied.

20 Claims, 12 Drawing Sheets

READ ARBITER CIRCUIT WITH DUAL MEMORY RANK SUPPORT

CROSS-REFERENCE TO RELATED APPLICATIONS

The present application claims priority to U.S. Provisional App. No. 63/376,215 entitled "Read Arbiter Circuit with Duel Memory Rank Support," filed Sep. 19, 2022, the disclosure of which is incorporated by reference herein in its entirety.

BACKGROUND

Technical Field

The embodiments described herein generally relate to memory access within computing systems and, more particularly, to scheduling memory access requests using linked lists.

Description of the Relevant Art

Computing systems, containing systems-on-a-chip (SoCs), include processors and multiple memory circuits that store software programs or applications, as well as data being operated on by the processors. Such memory circuits may vary in storage capacity as well as access time. In some computing systems, some memory circuits are coupled to the processors via a memory control circuit communicating with the processors via a communication link or other communication network.

During operation, the processors, which may include processor cores, graphics processors, and the like, transmit requests for access (also referred to as "access requests") to the memory control via the communication link. Such requests may include requests to retrieve previously stored data from the memory circuits or requests to store new data in the memory circuits. The memory control receives the requests and arbitrates access to the memory circuits for the requests based on various criteria. Upon relaying a particular request from a processor to the memory circuits, the memory control circuit waits until the memory circuits have completed the particular request, at which point the memory control circuit sends an acknowledgement signal and, in the case of a read access, sends the requested data to the processor that initiated the request. In some cases, the memory control circuit may acknowledge a write request before data associated with the write request has been written to memory in a procedure commonly referred to as "posting a write."

DETAILED DESCRIPTION OF EMBODIMENTS

Figure 1:
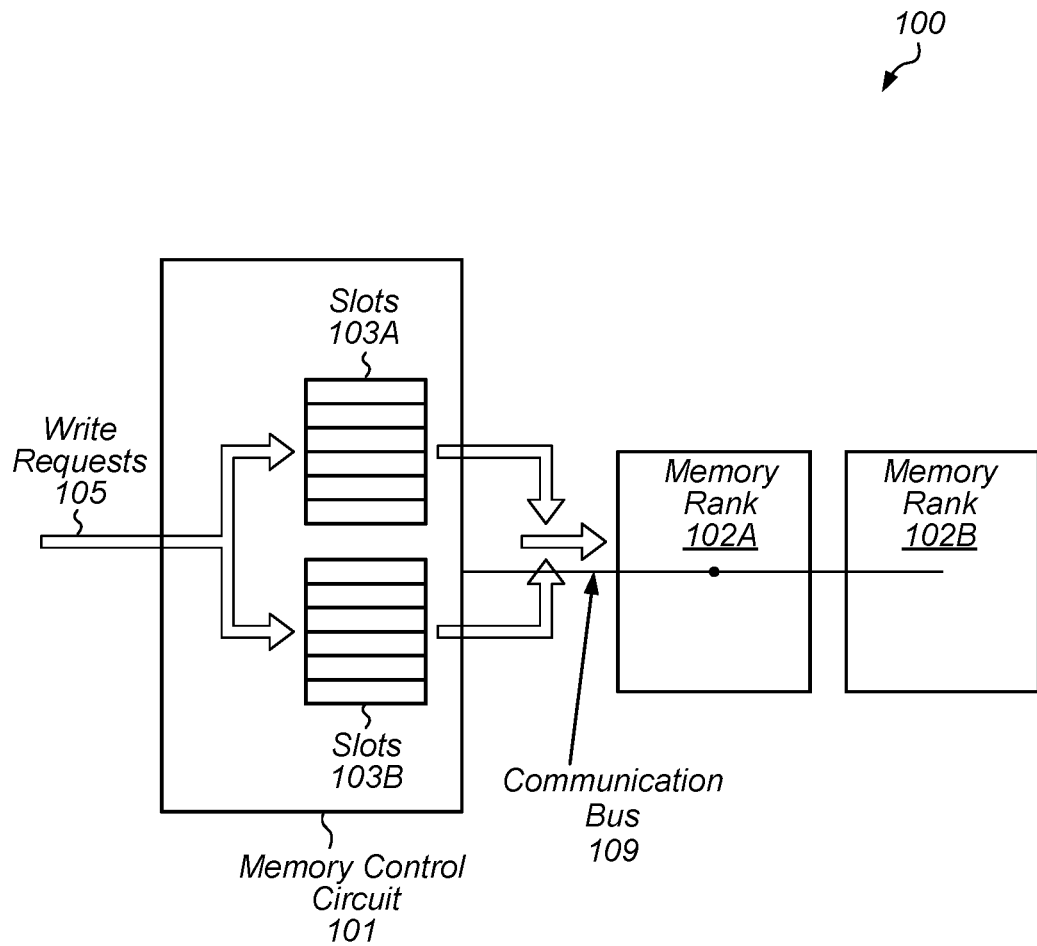
FIG. 1 illustrates a block diagram of an embodiment of a memory system configured to perform write arbitration.

During operation of a computing system, processors, processor cores, and other processing circuits generate requests to access memory circuits (commonly referred to as "memory access requests"). Such requests may be to store data into a memory circuit, retrieve program instructions from the memory circuit, retrieve data from the memory circuit for further processing, retrieve data from the memory circuit for display, speculative retrieval from the memory circuit of program instructions or data to fill cache memories, and the like. Depending on the type of information being stored or retrieved, or the purpose for which retrieved information is being used, a priority level may be assigned to a particular memory access request through the use of virtual channels, which specify a quality-of-service level for the particular memory access request.

To increase storage capacity in a computing system, multiple memory circuits can be coupled together to act as a single larger memory circuit. One arrangement of memory circuits that is used in computing systems include multiple memory circuits connected to a common data bus and a common activation/control signal, with each of the memory circuits contributing to a portion of the overall width of the common data bus. Such an arrangement of memory circuits is referred to as a "rank."

In order to satisfy the desired quality-of-service levels, a memory control circuit may arbitrate access to a memory circuit by selecting a particular memory access request to send to the memory circuit based on the memory access request's assigned virtual channel, an address to be accessed, and the like. To perform such arbitration, the memory control circuit may examine multiple memory access requests before selecting the particular memory access request. In some cases, the more memory access requests that can be examined, the better the arbitration result, and better utilization of the memory circuit's available bandwidth.

To help make accesses to multiple ranks of memory efficient, multiple read accesses are grouped together in a "read turn," and multiple write accesses are grouped together in a "write turn." Within a given read or write turn, each rank is allotted a number of slots from a total number of slots that can be performed within the during of the given read or write turn. During a read or write turn, different ranks of the multiple ranks may be accessed based on how accesses are distributed into the available slots. When switching from accessing one rank to another within a write turn, there is a period of time during the switch when no writes are being performed, which limits the number of writes that can be performed during the write turn (referred to as "efficiency").

Typically, for a given write turn a number of slots are designated for each memory rank. Queued write accesses are allocated to the designated write slots based on a proportion of write accesses to each rank included in the queued write accesses. Once the writes to a given rank are completed in particular write turn, a rank switch occurs. Since a rank switch involves multiple memory devices from one memory rank disconnecting from the communication bus, followed by other memory devices from another memory rank connecting to the communication bus, switching ranks consumes time that could be used for performing write operations which impacts the efficiency of the particular write turn.

Since write accesses are posted, the operation of the rest of the computer system is unaffected by when individual write accesses are performed as long as the writes are as efficient as possible. The efficiency of writes may be improved by limiting the number of rank switches within a write turn. If the write queue of a memory circuit can be made sufficiently large, there may be a sufficient number of write accesses to a given memory rank that an entire write turn can be spent writing to the given memory rank without having to initiate a rank switch to another memory rank.

In addition to write efficiency of the communication bus for memory ranks being important, during read turns, latency is also important so that circuit blocks within a computing system are not stalled while waiting for requested data. The situation is further complicated by a "real-time" bandwidth that is guaranteed to the computing system. In some cases, the number of read accesses with a real-time quality-of-service to satisfy the bandwidth requirement can fall behind.

To address the various competing constraints, different operating modes may be used during different read turns based on how well the real-time quality-of-service is being satisfied. For example, in cases where the real-time quality-of-service is behind, a number of rank switches may be limited to conserve bandwidth, while in cases where the real-time quality-of-service is satisfied, multiple rank switches may be employed to trade off efficiency in favor of reducing latency.

The embodiments illustrated in the drawings and described below may provide techniques for improving write efficiency while satisfying the competing constraints during read operations. Write efficiency can be improved by taking advantage of a deep write queue to reallocate write slots designated for one memory rank to another memory rank so that a write turn has the largest possible number of write accesses to the other memory rank before initiating a rank switch. Competing quality-of-service requirements can be addressed by determining a number of rank switches within a read turn based on whether a given quality-of-service requirement is being met.

A block diagram of an embodiment of a memory system is illustrated in FIG. 1. As shown, memory system 100 includes memory control circuit 101, which is coupled to memory ranks 102A and 102B via communication bus 109.

As described below, memory ranks 102A and 102B includes respective pluralities of discrete memory devices coupled to a common communication bus and a common set of control signals. Although two memory ranks are depicted in the embodiment of FIG. 1, in other embodiments, any suitable number of memory ranks may be employed.

Memory control circuit 101 is configured to receive write requests 105 for memory ranks 102A and 102B. In various embodiments, write requests 105 includes a first subset of write requests to memory rank 102A, and a second subset of write requests to memory rank 102B. In some embodiments, a given write request of write requests 105 includes information indicative of an address and data to be stored at a location within one of memory ranks 102A or 102B corresponding to the address.

In response to an initiation of a first write turn to memory ranks 102A and 102B, memory control circuit 101 is further configured to allocate one or more of the first subset of write requests to corresponding slots of slots 103A, which are designated for memory rank 102A.

Memory control circuit 101 is further configured, in response to a determination that unallocated write requests remain in the first subset, to increase a number of slots in slots 103A using one or more slots from slots 103B, which are designated for memory rank 102B. Additionally, memory control circuit 101 is also configured to allocate one or more of the unallocated write requests to corresponding slots added to slots 103A, and send write requests allocated to slots 103A to memory rank 102A during the first write turn. In a second write, subsequent to the first write turn, the memory control circuit 101 is further configured to send write requests allocated to slots 103B to memory rank 102B.

As described below, memory control circuit 101 may include memory circuits for storing write requests 105 during the allocation process. Additionally, memory control circuit 101 may include a microcontroller or state machine configured to perform the allocation of write requests into slots 103A and slots 103B.

Figure 2:
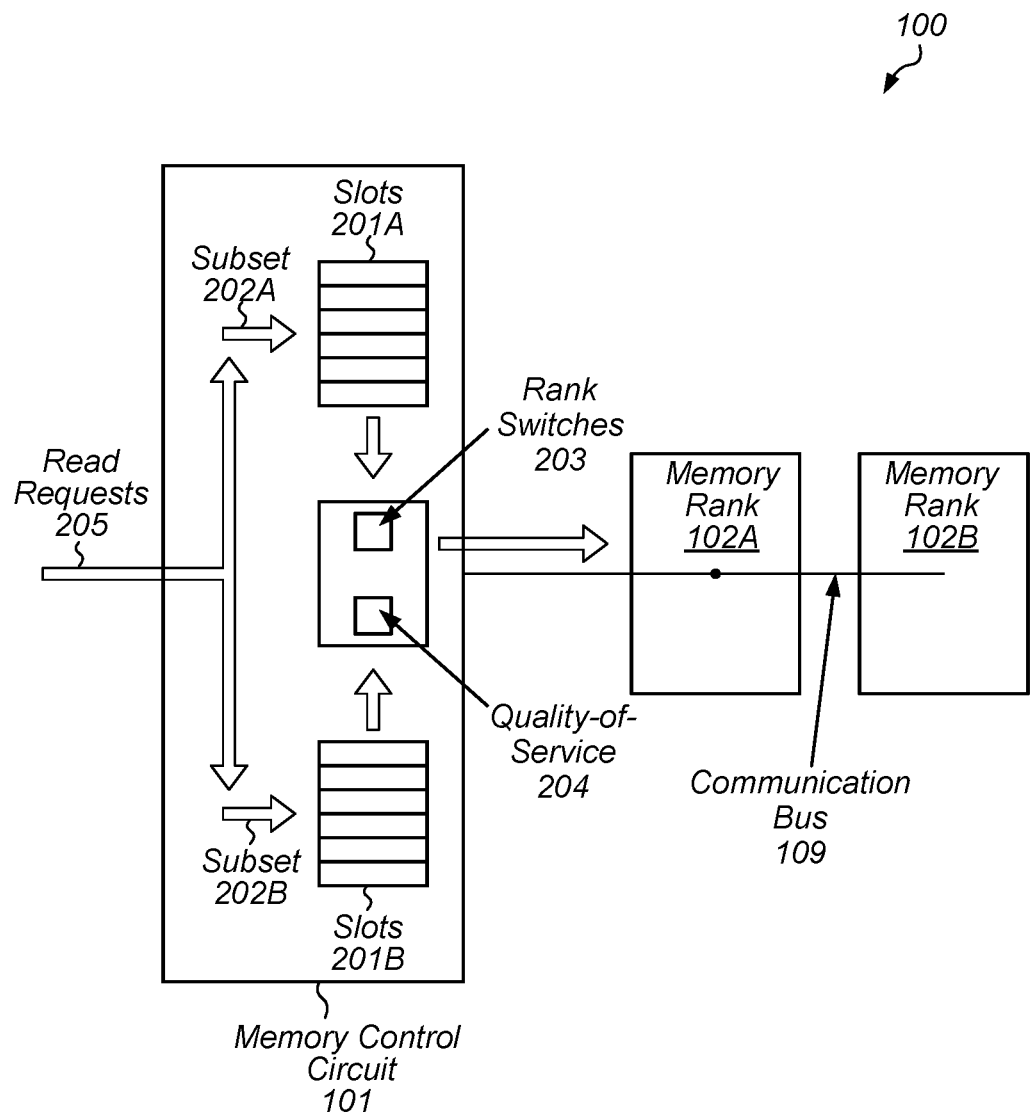
FIG. 2 illustrates a block diagram of an embodiment of a memory system configured to perform read arbitration.

In addition to processing write requests, memory control circuit 101 can also be configured to process read requests. Unlike write requests where high efficiency is a goal, read requests are allocated across read turns to ensure one or more quality-of-service requirements are met. A block diagram of memory system 100 processing read requests is depicted in FIG. 2.

As noted above, memory ranks 102A and 102B includes respective pluralities of discrete memory devices coupled to a common communication bus and a common set of control signals. Although two memory ranks are depicted in the embodiment of FIG. 2, in other embodiments, any suitable number of memory ranks may be employed.

Memory control circuit 101 is configured to receive read requests 205, which includes subset 202A and subset 202B. In various embodiments, subset 202A includes read requests directed to memory rank 102A, and subset 202B includes read requests directed to memory rank 102B.

In response to an initiation of a read turn to memory ranks 102A and 102B, memory control circuit 101 is configured to allocate, based on respective numbers of requests in subsets 202A and 202B, slots 201A for read requests included in subset 202A, and slots 201B for read requests included in subset 202B. In various embodiments, the combined number of slots 201A and slots 201B corresponds to a total number of read requests that can be performed within a read turn.

Memory control circuit 101 is also configured to determine, for the read turn, a number of rank switches 203 between memory rank 102A and memory rank 102B based on quality-of-service 204 associated with read requests 205. Additionally, memory control circuit 101 is configured to perform allocated read request during the read turn using rank switches 203. In some embodiments, quality-of-service 204 may include a real-time bandwidth quality-of-service requirement, a low-latency quality-of-service requirement, or any other suitable quality-of-service requirement.

Figure 3:
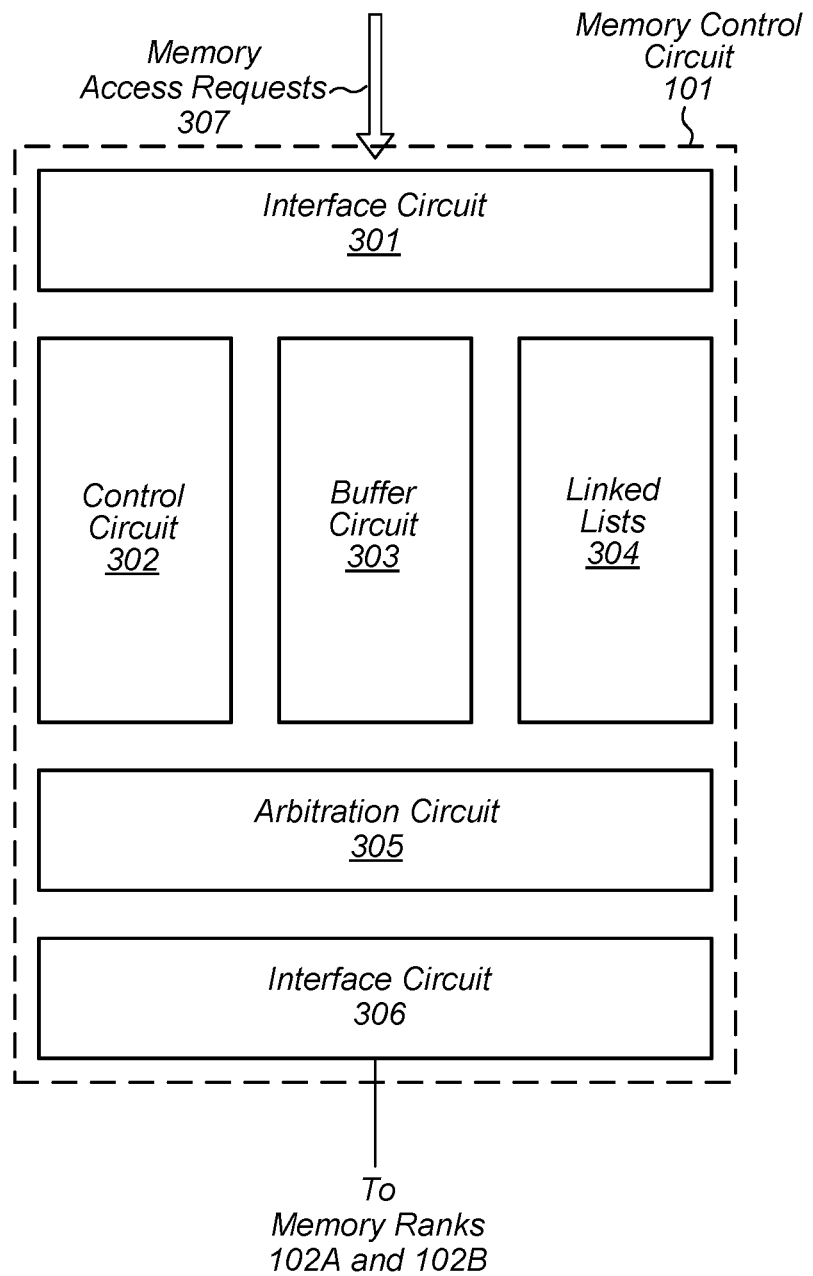
FIG. 3 illustrates a block diagram depicting an embodiment of a memory control circuit.

A block diagram of memory control circuit 101 is illustrated in FIG. 3. As shown, memory control circuit 101 includes interface circuit 301, control circuit 302, buffer circuit 303, linked lists 304, arbitration circuit 305, and interface circuit 306.

Interface circuit 301 is a particular embodiment of a state machine or other sequential logic circuit, and is configured to receive memory access requests 307. In various embodiments, such memory access requests (e.g., write requests 105 and read requests 205) may be generated by a processor, processor core, or other suitable agent in a computer system including memory control circuit 101. In various embodiments, interface circuit 301 may receive multiple payload packets as part of a memory access request and reassemble a complete version of the memory access request upon receiving all of the payload packets.

Control circuit 302 may be a particular embodiment of a state machine or other sequential logic circuit configured to perform various functions in regard to the management of linked lists 304. Such functions may allow memory control circuit 101 to ensure forward progress of read requests, take advantage of read requests to a same memory page, and the like.

For example, in some embodiments, control circuit 302 is configured to select a previously received read request in response to a determination that an age of the previously received read request is greater than a threshold value. By comparing ages of read requests, control circuit 302 ensures that read requests are not left unscheduled indefinitely but will move forward and be scheduled at some point.

As described above, control circuit 302 may be configured to determine a number of rank switches during a read operation. In various embodiments, control circuit 302 may be further configured to limit the number of rank switches to one, in response to a determination that a real-time bandwidth quality-of-service requirement is not satisfied. Control circuit 302 may be additionally configured to allow more than one rank switch, in response to a determination that the real-time bandwidth quality-of-service requirement is satisfied.

Buffer circuit 303 may be a particular embodiment of a memory circuit or other suitable storage circuit that is used to store write data associated with write accesses. As described below in more detail, multiple write requests may be directed to a common rank within ranks 102A and 102B.

As described below in more detail, linked lists 304 may be a particular embodiment of a register file or other suitable storage circuit configured to store multiple read and write requests and maintain respective sets of links between stored read requests and between stored write requests based on respective criteria. For example, linked lists 304 may include a linked list, in which stored read requests are linked in an order corresponding to their respective durations (or ages) of the read requests that have been inserted into linked lists 304.

Arbitration circuit 305 is configured to allocate a particular read request or a particular write request to a corresponding slot by selecting a read request or a write request stored in linked lists 304. In various embodiments, arbitration circuit 305 may select the read request based on values of head pointers for individual linked lists included in linked lists 304 along with other various criteria. In some cases, arbitration circuit 305 may include numerous multiplex circuits configured to select particular ones of read requests stored in linked lists 304 using any criteria.

In some embodiments, arbitration circuit 305 may be configured, in response to an initiation of a read turn, select an initial memory rank of the plurality of memory ranks to begin the read turn. Arbitration circuit 305 may, in various embodiments, be configured to select the initial memory rank according to one of various operating modes. For example, in some cases, arbitration circuit 305 may be configured to select the initial memory rank based on which memory rank of the plurality of ranks has an oldest pending low-latency quality-of-service read request. Alternatively, arbitration circuit 305 may be configured to select the initial memory rank based on which memory rank has the largest number of pending low-latency quality-of-service read requests pending, which memory rank has the smallest number of low-latency quality-of-service read requests pending, or on which memory rank was recently used during a write turn. In some cases, arbitration circuit 305 may use a weight function to select the initial memory rank, where the weight function is determined based on respective numbers of low-latency quality-of-service read requests pending for each memory rank, where the respective numbers are capped at a maximum number of slots that can utilized during a read turn.

Interface circuit 306 is configured to generate one or more memory commands (commonly referred to as "atomic commands") based on a memory access request and send the one or more memory commands to memory ranks 102A and 102B. For example, a read request may result in the generation of an open page command, a read command for at least a portion of the open page, and a close page command. Alternatively, a write request may result in the generation of an open page command, a write command for at least a portion of the open page, and a close page command.

In various embodiments, interface circuit 306 may format and send the memory commands according to one of various communication protocols, such as a double data rate (DDR) communication protocol, for example. Interface circuit 306, which may be a particular embodiment of a state machine or a sequential logic circuit, may also be configured to receive data from memory ranks 102A and 102B and relay the data to interface circuit 301 for transmission to a requesting processor, processor core, or other agent in the computer system.

It is noted that the embodiment depicted in FIG. 3 is merely an example and that the partitioning of functionality amongst the depicted blocks is for the purposes of explanation. In other embodiments, the functionality of memory control circuit 101 may be divided amongst different circuit blocks and different numbers of circuit blocks.

Figure 4:
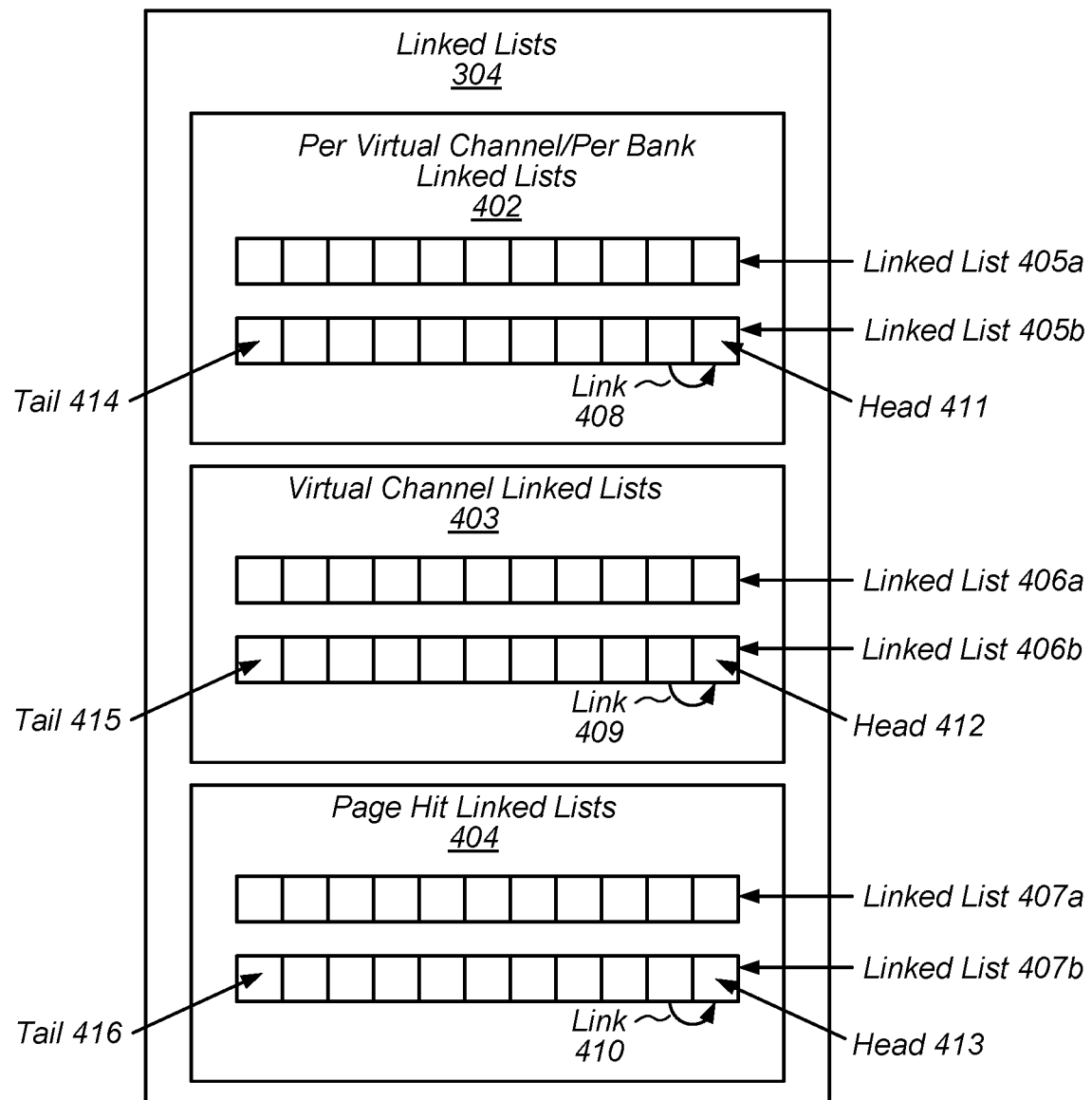
FIG. 4 illustrates a block diagram depicting an embodiment of linked lists used by a memory control circuit.

As previously mentioned, memory control circuit 101 may employ multiple different linked lists. Such linked lists may correspond to different physical or virtual structures within a memory system. An embodiment of linked lists 304 is illustrated in the block diagram of FIG. 4. As shown, linked lists 304 includes three different categories of linked lists, named per virtual channel/per bank linked lists 402, virtual channel linked lists 403, and page hit linked lists 404.

Per virtual channel/per bank linked lists 402 includes linked lists 405a and 405b, each of which corresponds to read requests associated with a particular virtual channel for a particular bank. For example, linked list 405b may include read requests for low-latency read transactions directed to a particular bank within a memory device included in memory ranks 102A and 102B as illustrated in FIGS. 1 and 2. Each of linked lists 405a and 405b includes a head (or "first") entry and a tail (or "last") entry. For example, linked list 405b includes head 411 and tail 414.

Within each of linked lists 405a and 405b, read requests are ordered according to their respective ages, with older read requests being closer to head 411. For example, link 408 links a read request to a next older read request. It is noted that for the sake of clarity, only a single link has been depicted. By organizing read requests for each bank by age and associated virtual channel, a memory control circuit may ensure desired bandwidth levels for each virtual channel as well as ensuring desired levels of bank utilization within a given memory circuit of a particular memory rank.

Virtual channel linked lists 403 includes linked lists 406a and 406b, each of which corresponds to a respective virtual channel of multiple virtual channels associated with the read requests. For example, linked list 406a may include read request assigned to a low-latency transaction (or simply "LLT") virtual channel. Each list includes a head entry and a tail entry in the list. For example, linked list 406b includes head 412 and tail 415.

Within each of linked lists 406a and 406b, read requests are ordered according to their respective ages, i.e., older read requests are closer to head 412 of the list. For example, link 409 links a read request to a next older read request. It is noted that only a single link is shown for the purposes of clarity. By organizing read requests according to both age and virtual channel, a memory control circuit, such as, e.g., memory control circuit 101, can select an older transaction with a higher quality-of-service level based on the virtual channel linked lists. It is noted that although only two linked lists are shown being included in virtual channel linked lists 403, in other embodiments, any suitable number of virtual channel linked lists may be employed. For example, in some cases, linked lists for LLT, real time (or "RT") transactions, and bulk transactions (also referred to as "best effort transactions") may be employed. In various embodiments, an arbitration circuit may select an oldest read request on a per virtual channel basis using head pointers for the linked lists included in virtual channel linked lists 403. To arbitrate across banks, the arbitration circuit may use head pointers for the linked lists in per virtual channel/per bank linked lists 402.

Page hit linked lists 404 includes linked lists 407a and 407b, each of which are associated with a particular page in a memory circuit. For example, linked list 407b includes read requests to a common page arranged in age order by respective links such as link 410 for example. It is noted that only a single link is depicted for the purposes of clarity. Each of linked lists 407a and 407b includes a head and a tail. For example, linked list 407b includes head 413 and tail 416.

Each of linked lists 407a-b are virtual channel aware such that only page hits associated with the same virtual channel are linked together. By making the page hit linked lists virtual channel aware, a memory control circuit can ensure a desired bandwidth for each of the virtual channels, while taking advantage of scheduling read requests to a common page for read accesses associated with a common virtual channel.

It is noted that a given read request may be present in multiple of the aforementioned linked lists. When such a read request is scheduled, the read request may be removed from each list in which it was included. As described above, removal of a read request from a linked list may be performed by relinking the list.

Figure 5:
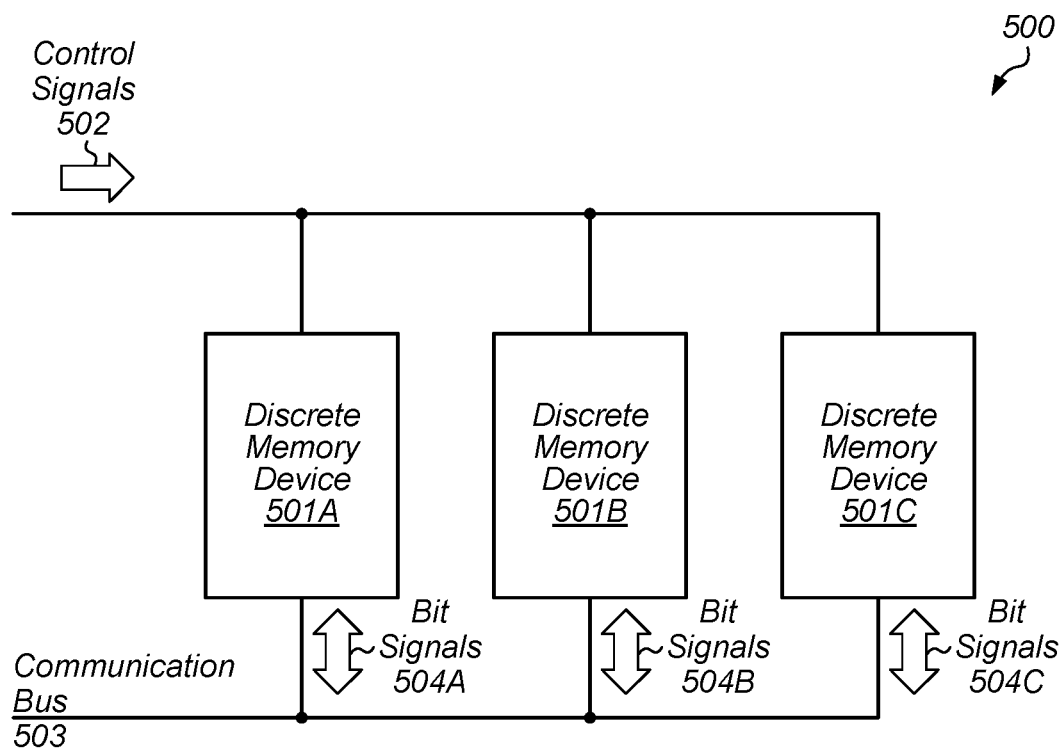
FIG. 5 illustrates a block diagram of a memory rank.

A block diagram of an embodiment of a memory rank is depicted in FIG. 5. As illustrated, memory rank 500 includes discrete memory devices 501A-501C. In various embodiments, memory rank 500 may correspond to any of memory ranks 102A or 102B as depicted in FIGS. 1 and 2.

Discrete memory devices 501A-501C may be packaged devices or unpackaged semiconductor chips soldered or mounted on a common substrate or circuit board. In various embodiments, the common substrate or circuit board may be different from a substrate or circuit board on which memory control circuit 101 is mounted. Each of discrete memory devices 501A-501C are coupled to control signals 502. In various embodiments, control signals 502 may include a clock signal, address signals, mode signal (e.g., a read signal or a write signal), or any other suitable signals.

Discrete memory devices 501A-501C are additionally coupled to communication bus 503. As illustrated, each of discrete memory devices 501A-501C are coupled to different bits of communication bus 503, with discrete memory device 501A configured to send or receive bit signals 504A via a first set of bits of communication bus 503. In a similar fashion, discrete memory devices 501B and 501C are configured to send or receive bit signals 504B and 504C via a second set of bits and a third set of bits of communication bus 503, respectively. It is noted that when memory rank 500 is activated, all of discrete memory devices 501A-501C are active sending data to or receiving data from memory control circuit 101 via corresponding sets of bits of communication bus 503.

In various embodiments, discrete memory devices 501A-501C may be implemented using any suitable type of discrete memory device. For example, in some embodiments, discrete memory devices 501A-501C may be implemented using discrete dynamic random-access memory (DRAM) circuits. In some embodiments, such DRAM circuits may include multiple banks that can include multiple pages. Address information included within write requests 105 and read requests 205 may specify a particular bank and a page within the particular bank to access as part of a read or write access.

It is noted that although only three discrete memory devices are depicted in the embodiment of FIG. 5, in other embodiments, any suitable number of discrete memory devices may be employed.

To summarize, various embodiments of a memory control circuit for a computer system are disclosed. Broadly speaking, an apparatus is contemplated in which a memory control circuit is configured to receive a plurality of write requests for a plurality of memory ranks, where a given memory rank includes a plurality of discrete memory devices coupled to a common communication bus and a common set of control signals. In some embodiments, the plurality of write requests includes a first subset of write requests to a first memory rank of the plurality of memory ranks, and a second subset of write requests to a second rank of the plurality of memory ranks.

In response to an initiation of a first write turn to the plurality of memory ranks, the memory control circuit is further configured to allocate one or more of the first subset of write requests to corresponding slots of a first set of slots designated for the first memory rank. The memory control circuit is further configured, in response to a determination that unallocated write requests remain in the first subset, to increase a number of slots in the first set of slots using one or more slots from a second set of slots designated for the second memory rank.

The memory control circuit can also be configured to receive a plurality of read requests for the plurality of memory ranks, where the plurality of read requests includes a first subset of read requests to a first memory rank of the plurality of memory ranks, and a second subset of read requests to a second memory rank of the plurality of memory ranks. In response to an initiation of a read turn to the plurality of memory ranks, the memory circuit is configured to allocate, based on respective numbers of requests in the first subset and the second subset, a first number of slots of a total number of slots for read requests included in the first subset, and a second number of slots of the total number of slots for read requests included in the second subset. Additionally, the memory control circuit is configured to determine, for the read turn, a number of rank switches between the first memory rank and the second memory rank based on at least one quality-of-service requirement associated with the plurality of read requests, and to perform allocated read requests during the read turn using the number of rank switches.

Figure 6:
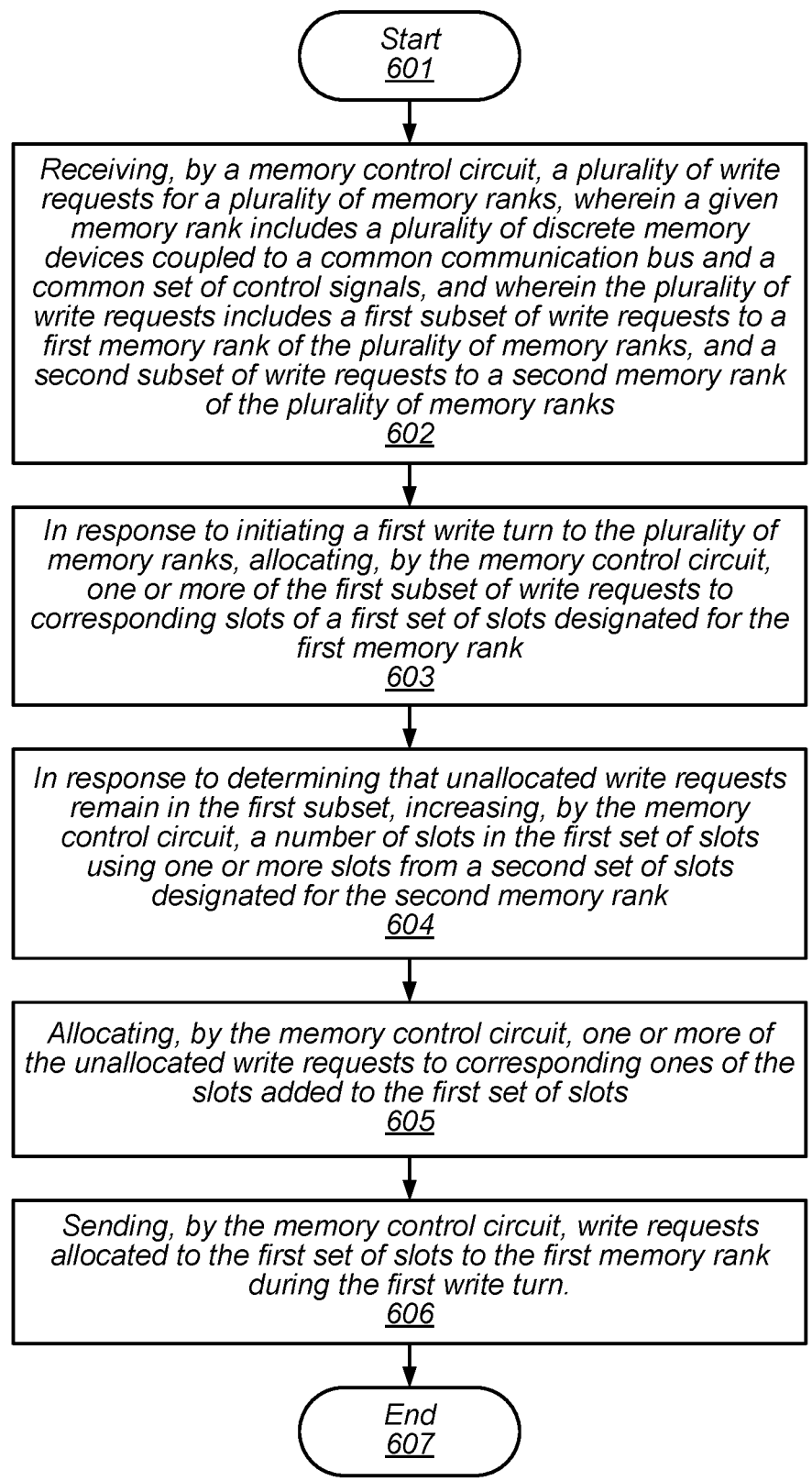
FIG. 6 illustrates a flow diagram depicting an embodiment of a method for allocating write accesses to different memory ranks during a write turn.

A flow diagram depicting an embodiment of a method for operating a memory control circuit is illustrated in FIG. 6. The method, which begins at block 601, may be applicated to various memory control circuits including memory control circuit 101 as depicted in FIGS. 1 and 2.

The method includes receiving, by a memory control circuit, a plurality of write requests for a plurality of memory ranks, wherein a given memory rank includes a plurality of discrete memory devices coupled to a common communication bus and a common set of control signals, and wherein the plurality of write requests includes a first subset of write requests to a first memory rank of the plurality of memory ranks, and a second subset of write requests to a second memory rank of the plurality of memory ranks (block 602).

In some embodiments the method also includes, inserting, by the memory control circuit, a given write request of the plurality of write requests into at least one linked list of a plurality of linked lists, wherein a particular linked list of the plurality of linked lists includes a plurality of previously received write requests linked according to respective ages of the plurality of previously received write requests.

The method further includes, in response to initiating a first write turn to the plurality of memory ranks, allocating, by the memory control circuit, one or more of the first subset of write requests to corresponding slots of a first set of slots designated for the first memory rank (block 603). In some embodiments, respective initial numbers of slots in the first set of slots and the second set of slots are based on respective numbers of write requests in the first subset of write requests and the second subset of write requests. In other embodiments, the respective initial numbers of slots in the first set of slots and the second set of slots are further based on at least one quality-of-service requirement.

In some embodiments the method includes, selecting, at the start of a given write turn, a starting memory rank of the plurality of memory ranks based on respective numbers of write requests allocated to the plurality of memory ranks.

The method also includes, in response to determining that unallocated write requests remain in the first subset, increasing, by the memory control circuit, a number of slots in the first set of slots using one or more slots from a second set of slots designated for the second memory rank (block 604). In some embodiments, increasing the number of slots in the first set of slots includes selecting a particular slot from the second set of slots based on a quality-of-service associated with the particular slot. In various embodiments, the quality-of-service includes a real-time bandwidth quality-of-service.

The method further includes allocating, by the memory control circuit, one or more of the unallocated write request to corresponding ones of the slots added to the first set of slots (block 605).

The method also includes sending, by the memory control circuit, write requests allocated to the first set of slots to the first memory rank during the first write turn (block 606). In some embodiments, the method further includes sending, by the memory control circuit, write requests allocated to the second set of slots during a second write turn subsequent to the first write turn. The method concludes in block 607.

Figure 7:
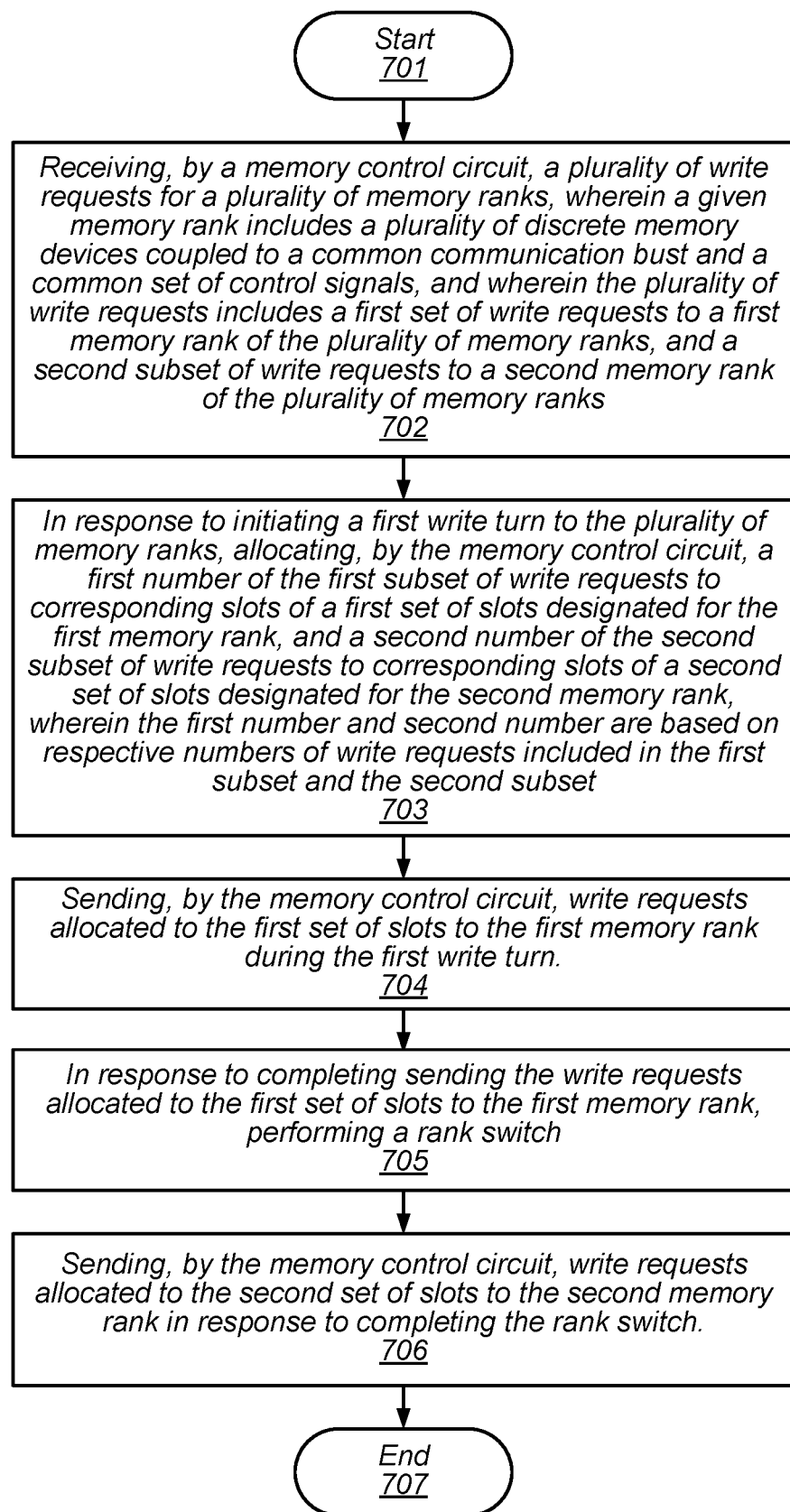
FIG. 7 illustrates a flow diagram depicting another embodiment of a method for allocating write accesses to different memory ranks during a write turn.

Turning to FIG. 7, a flow diagram depicting an embodiment of a method for operating a memory control circuit is illustrated. The method, which begins in block 701, may be applied to various memory control circuits including memory control circuit 101 as depicted in FIGS. 1 and 2.

The method includes receiving, by a memory control circuit, a plurality of write requests for a plurality of memory ranks (block 702). In various embodiments, individual memory ranks of plurality of memory ranks include respective pluralities of discrete memory devices coupled to a common communication bus and a common set of control signals. In some embodiments, the common communication bus and control signals may implement one of various communication protocols such as a low-power double data rate (LPDDR) communication protocol.

The plurality of write requests may, in some embodiments, include a first subset of write requests to a first memory rank of the plurality of memory ranks and a second subset of write requests to a second memory rank of the plurality of memory ranks. The write requests may, in different embodiments, be generated by a processor, processor core, or other agent coupled to the memory control circuit via a communication bus that employs a particular communication protocol.

The method further includes, in response to initiating a first write turn to the plurality of memory ranks, allocating, by the memory control circuit, a first number of the first subset of write requests to corresponding slots of a first set of slots designated for the first memory rank, and a second number of the second subset of write request to corresponding slots of a second set of slots designated for the second memory rank (block 703). In some embodiments, the first number and the second number are based on respective numbers of write requests included in the first subset and the second subset.

The method also includes sending, by the memory control circuit, write requests allocated to the first set of slots to the first memory rank during the first write turn (block 704). In various embodiments, sending the write requests includes formatting the write requests according to a communication protocol of the communication bus coupled to the plurality of memory ranks.

The method further includes, in response to completing sending the write requests allocated to the first set of slots to the first memory rank, performing, by the memory control circuit, a rank switch (block 705). The method also includes sending, by the memory control circuit, write requests allocated to the second set of slots to the second memory rank in response to completing the rank switch (block 706). The method concludes in block 707.

Figure 8:
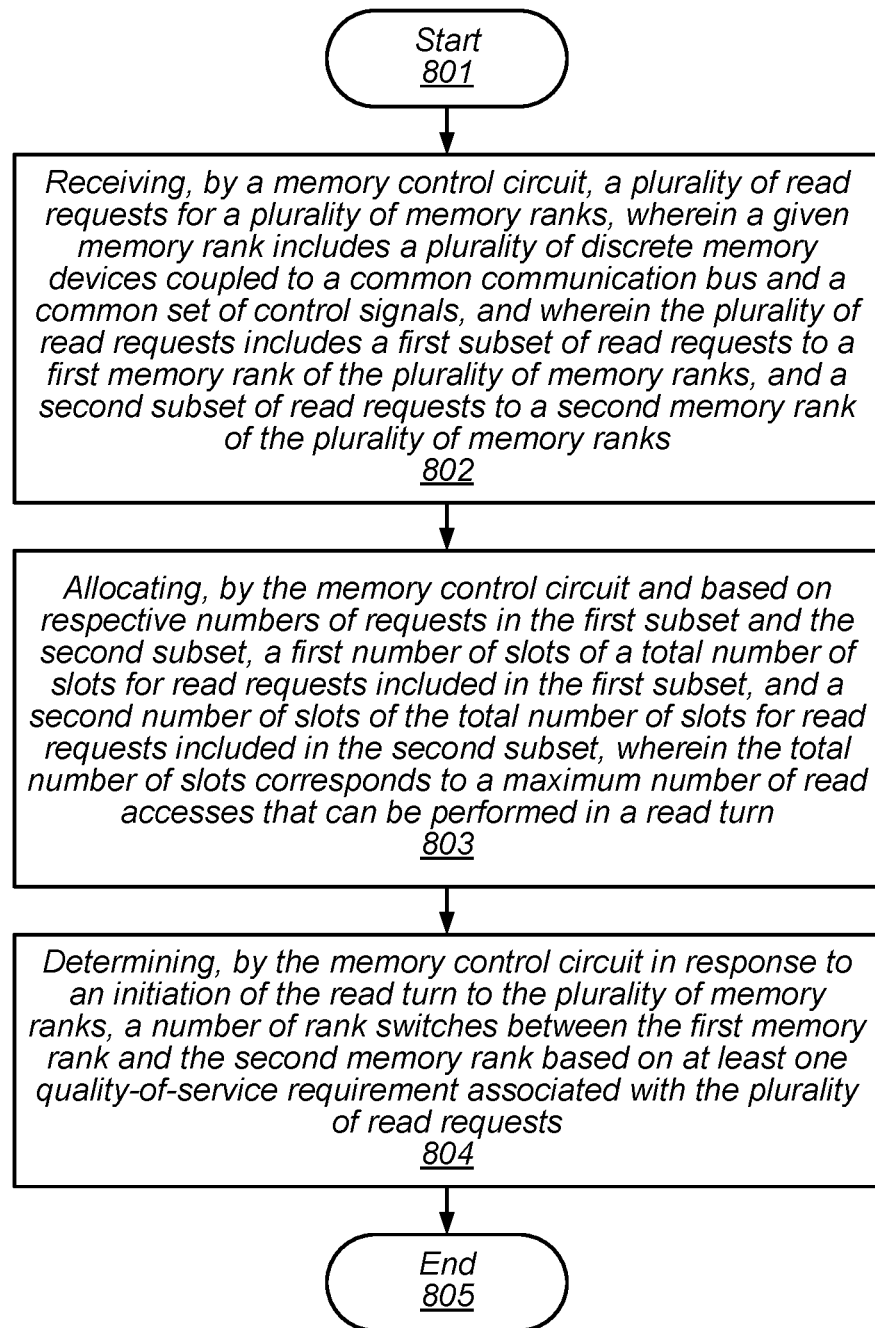
FIG. 8 illustrates a flow diagram depicting an embodiment of a method for allocating read accesses to different memory ranks during a read turn.

A flow diagram depicting an embodiment of a method for operating a memory control circuit is illustrated in FIG. 8. The method, which begins in block 801, may be applied to various memory control circuits including memory control circuit 101 as depicted in FIGS. 1 and 2.

The method includes receiving, by a memory control circuit, a plurality of read requests for a plurality of memory ranks (block 802). In various embodiments, a given memory rank of the plurality of memory ranks includes a plurality of discrete memory devices coupled to a common communication bus and a common set of control signals. In some embodiments, the common communication bus and control signals may implement one of various communication protocols such as a low-power double data rate (LPDDR) communication protocol.

The plurality of read requests may, in some embodiments, include a first subset of read requests to a first memory rank of the plurality of memory ranks and a second subset of read requests to a second memory rank of the plurality of memory ranks. The read requests may, in different embodiments, be generated by a processor, processor core, or other agent coupled to the memory control circuit via a communication bus that employs a particular communication protocol.

The method further includes allocating, by the memory control circuit and based on respective numbers of requests in the first subset and the second subset, a first number of slots of a total number of slots for read requests included in the first subset, and a second number of slots of the total number of slots for read request included in the second subset (block 803). In some embodiments, the total number of slots corresponds to a maximum number of read accesses that can be performed in a read turn.

The method also includes determining, by the memory circuit in response to an initiation of the read turn to the plurality of memory ranks, a number of rank switches between the first memory rank and the second memory rank based on at least one quality-of-service requirement associated with the plurality of read requests (block 804). In various embodiments, the at least one quality-of-service requirement includes a real-time bandwidth quality of service requirement.

In some embodiments, determining the number of rank switches includes setting, by the memory control circuit, the number of rank switches to one, in response to determining that the real-time bandwidth quality-of-service requirement is not satisfied. In other embodiments, determining the number of rank switches includes setting, by the memory control circuit, the number of rank switches to a number greater than one, in response to determining that the real-time bandwidth quality-of-service requirement is satisfied.

In various embodiments, the method also includes selecting, by the memory control circuit, an initial memory rank of the first memory rank or the second memory rank based on which rank has an oldest low-latency quality-of-service read request pending and performing a first set of allocated read requests associated with the initial memory rank. Alternatively, the method may include selecting the initial memory rank based on which memory rank has the largest number of pending low-latency read requests, or on which memory rank has the smallest number of pending low-latency quality-of-service requests, or on which memory rank was recently used during a write turn. In other embodiments, the memory may include determining a weight function for each memory rank based on a number of low-latency quality-of-services requests pending for each rank, capped at a number of slots that can be used during a read turn, and selecting the initial memory rank based on the respective weight functions.

The method may further include, in response to completing the first set of allocated read requests associated with the initial memory rank, switching to a different memory rank of the first memory rank or the second memory rank and performing a second set of allocated read requests associated with the different memory rank.

In some embodiments, the method may include selecting, by the memory control circuit, an initial memory rank of the first memory rank or the second memory rank based on which rank has a largest number of low-latency quality-of-service read requests pending, and performing a first set of allocated read requests associated with the initial memory rank. The method may additionally include, in response to completing the first set of allocated read requests associated with the initial memory rank, switching to a different memory rank of the first memory rank or the second memory rank, and performing a second set of allocated read requests associated with the different memory rank.

In a different embodiment, the method may include inserting, by the memory control circuit, a given read request of the plurality of read requests into at least one linked list of a plurality of linked lists, wherein a particular linked list of the plurality of linked lists includes a plurality of previously received read requests linked according to respective ages of the plurality of previously received read requests. The method concludes in block 805.

Figure 9:
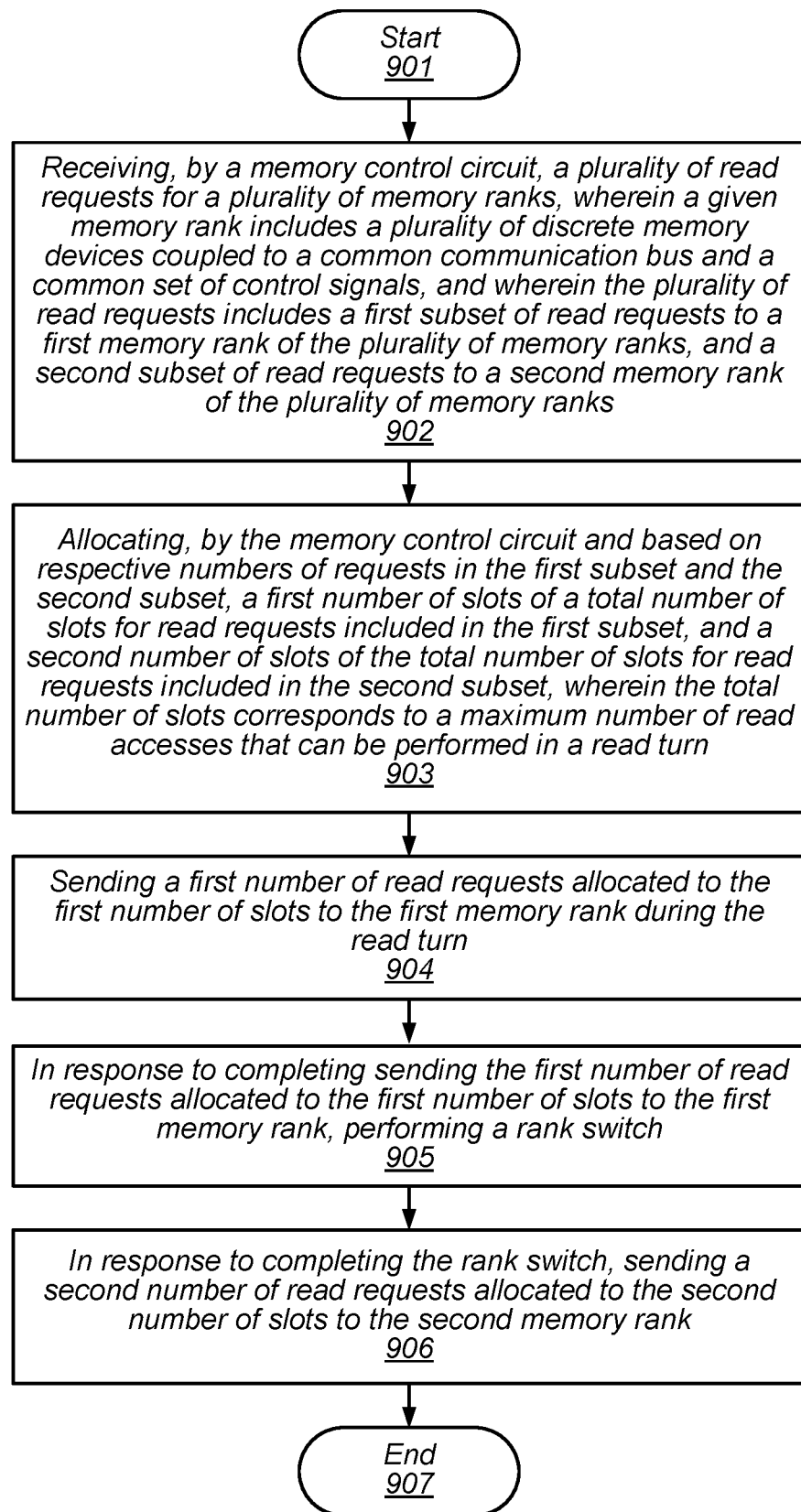
FIG. 9 illustrates a flow diagram depicting an embodiment of a different method for allocating read accesses to different memory ranks during a read turn.

Turning to FIG. 9, a flow diagram depicting an embodiment of another method for operating a memory control circuit is illustrated. The method, which begins in block 901, may be applied to various memory control circuits including memory control circuit 101 as depicted in FIGS. 1 and 2.

The method includes receiving, by a memory control circuit, a plurality of read requests for a plurality of memory ranks (block 902). In various embodiments, a given memory rank of the plurality of memory ranks includes a plurality of discrete memory devices coupled to a common communication bus and a common set of control signals. In some embodiments, the common communication bus and control signals may implement one of various communication protocols such as a low-power double data rate (LPDDR) communication protocol.

The plurality of read requests may, in some embodiments, include a first subset of read requests to a first memory rank of the plurality of memory ranks and a second subset of read requests to a second memory rank of the plurality of memory ranks. The read requests may, in different embodiments, be generated by a processor, processor core, or other agent coupled to the memory control circuit via a communication bus that employs a particular communication protocol.

The method further includes allocating, by the memory control circuit and based on respective numbers of requests in the first subset and the second subset, a first number of slots of a total number of slots for read requests included in the first subset, and a second number of slots of the total number of slots for read requests included in the second subset (block 903). In some embodiments, the total number of slots corresponds to a maximum number of read accesses that can be performed in a read turn.

The method also includes sending, by the memory control circuit, a first number of read requests allocated to the first number of slots to the first memory rank during the read turn. (block 904). The method further includes in response to completing sending the first number of read requests allocated to the first number of slots to the first memory rank, performing, by the memory control circuit, a rank switch (block 905). In various embodiments, performing the rank switch may include de-activating the first memory rank, and activating the second memory rank after verifying the first memory rank has been de-activated.

The method also includes, in response to completing the rank switch, sending, by the memory control circuit, a second number of read requests allocated to the second number of slots to the second memory rank (block 906). It is noted that, although a single rank switch is described in the flow diagram of FIG. 9, in other embodiments, additional ranks switches to different ones of the plurality of memory ranks may be performed. The method concludes in block 907.

Figure 10:
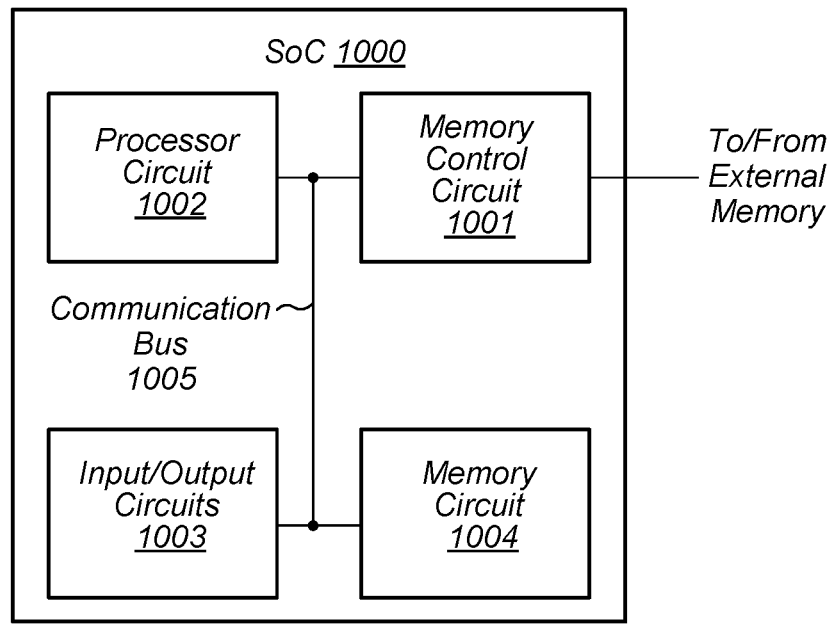
FIG. 10 depicts a block diagram of an embodiment of a system-on-a-chip.

A block diagram of a computer system is illustrated in FIG. 10. In the illustrated embodiment, computer system 1000 includes memory control circuit 1001, processor circuit 1002, input/output circuits 1003, and memory circuit 1004, each of which may be configured to send requests and data (collectively "transactions") to the other circuit blocks using communication bus 1005. In various embodiments, computer system 1000 may be configured for use in a desktop computer, server, or in a mobile computing application such as, e.g., a tablet, laptop computer, or wearable computing device. Although four circuit blocks are depicted in the embodiment of FIG. 10, in other embodiments, any suitable number of circuit blocks may be included in computer system 1000.

Memory control circuit 1001 is configured to schedule access requests to external memory. In various embodiments, memory control circuit 1001 may correspond to memory control circuit 101 as illustrated in FIG. 1, and access requests may include both memory read access requests and memory write access requests. Such access requests may be received from processor circuit 1002, input/output circuits 1003, or any other suitable circuit block included in computer system 1000 (not shown).

Processor circuit 1002 may, in various embodiments, be representative of a general-purpose processor that performs computational operations. For example, processor circuit 1002 may be a central processing unit (CPU) such as a microprocessor, a microcontroller, an application-specific integrated circuit (ASIC), or a field-programmable gate array (FPGA).

Memory circuit 1004 may include any suitable type of memory such as a Dynamic Random-Access Memory (DRAM), a Static Random-Access Memory (SRAM), a Read-only Memory (ROM), an Electrically Erasable Programmable Read-only Memory (EEPROM), or a non-volatile memory, for example. It is noted that in the embodiment of an integrated circuit illustrated in FIG. 9, a single memory circuit is depicted. In other embodiments, any suitable number of memory circuits may be employed.

Input/output circuits 1003 may be configured to coordinate data transfer between computer system 1000 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1003 may be configured to implement a version of Universal Serial Bus (USB) protocol or IEEE 1394 (Firewire®) protocol.

Input/output circuits 1003 may also be configured to coordinate data transfer between computer system 1000 and one or more devices (e.g., other computing systems or integrated circuits) coupled to computer system 1000 via a network. In one embodiment, input/output circuits 1003 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1003 may be configured to implement multiple discrete network interface ports.

Figure 11:
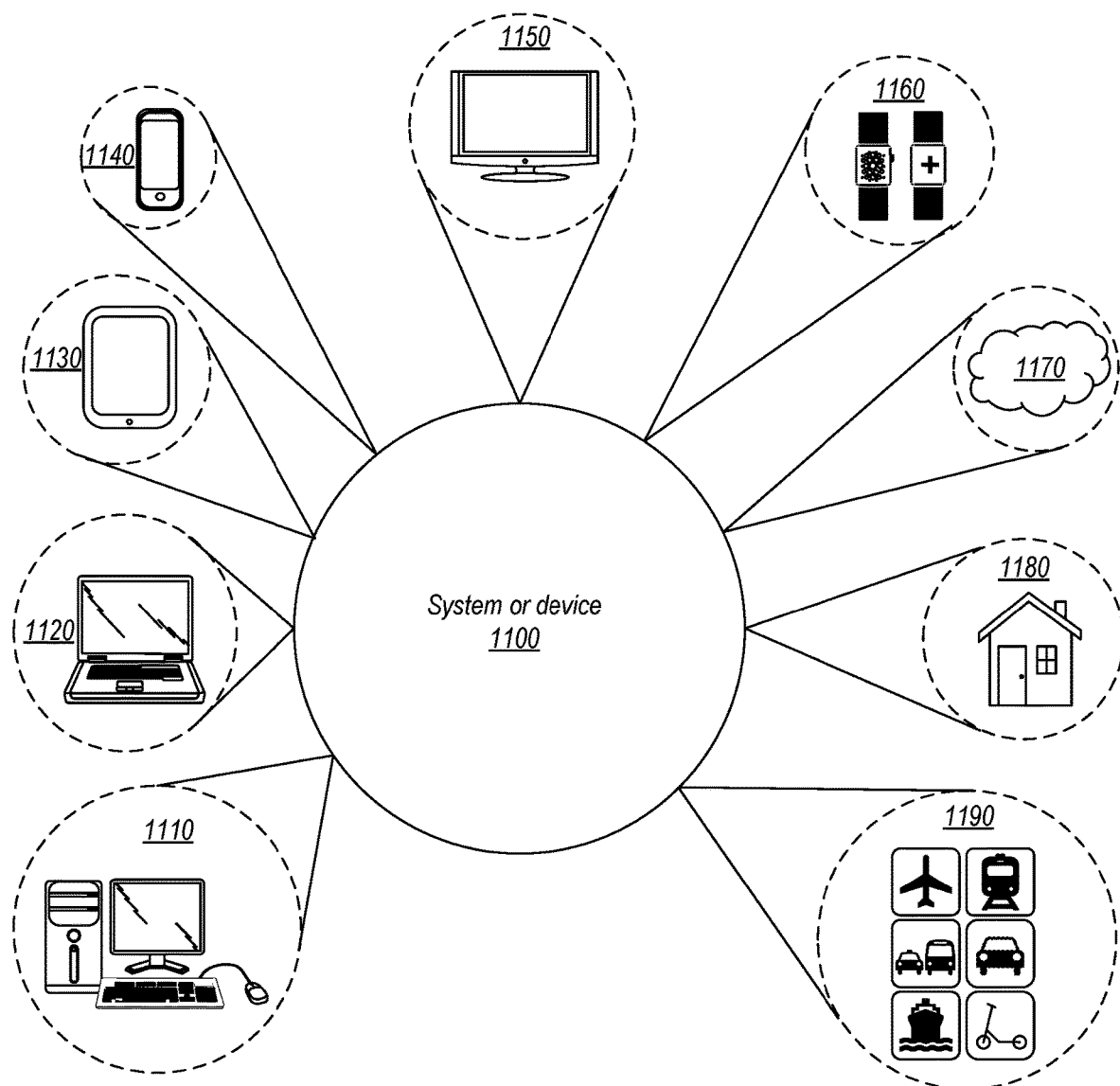
FIG. 11 is a block diagram of various embodiments of computer systems that may include memory control circuits.

Turning now to FIG. 11, various types of systems that may include any of the circuits, devices, or systems discussed above are illustrated. System or device 1100, which may incorporate or otherwise utilize one or more of the techniques described herein, may be utilized in a wide range of areas. For example, system or device 1100 may be utilized as part of the hardware of systems such as a desktop computer 1110, laptop computer 1120, tablet computer 1130, cellular or mobile phone 1140, or television 1150 (or set-top box coupled to a television).

Similarly, disclosed elements may be utilized in a wearable device 1160, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1100 may also be used in various other contexts. For example, system or device 1100 may be utilized in the context of a server computer system, such as a dedicated server or on shared hardware that implements a cloud-based service 1170. Still further, system or device 1100 may be implemented in a wide range of specialized everyday devices, including devices 1180 commonly found in the home such as refrigerators, thermostats, security cameras, etc. The interconnection of such devices is often referred to as the "Internet of Things" (IoT). Elements may also be implemented in various modes of transportation. For example, system or device 1100 could be employed in the control systems, guidance systems, entertainment systems, etc. of various types of vehicles 1190.

The applications illustrated in FIG. 11 are merely exemplary and are not intended to limit the potential future applications of disclosed systems or devices. Other example applications include, without limitation: portable gaming devices, music players, data storage devices, unmanned aerial vehicles, etc.

Figure 12:
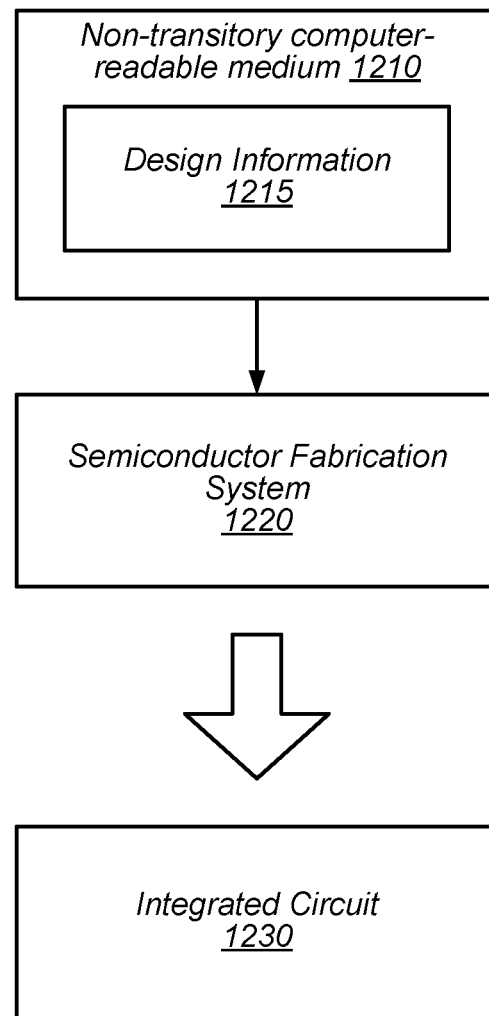
FIG. 12 illustrates a block diagram of a computer-readable medium storing design information for an integrated circuit.

FIG. 12 is a block diagram illustrating an example of a non-transitory computer-readable storage medium that stores circuit design information, according to some embodiments. In the illustrated embodiment, semiconductor fabrication system 1220 is configured to process design information 1215 stored on non-transitory computer-readable storage medium 1210 and fabricate integrated circuit 1230 based on design information 1215.

Non-transitory computer-readable storage medium 1210 may comprise any of various appropriate types of memory devices or storage devices. Non-transitory computer-readable storage medium 1210 may be an installation medium, e.g., a CD-ROM, floppy disks, or tape device; a computer system memory or random-access memory such as DRAM, DDR RAM, SRAM, extended data out (EDO) RAM, Rambus RAM, etc.; a non-volatile memory such as a Flash, magnetic media, e.g., a hard drive, or optical storage; registers, or other similar types of memory elements, etc. Non-transitory computer-readable storage medium 1210 may include other types of non-transitory memory as well or combinations thereof. Non-transitory computer-readable storage medium 1210 may include two or more memory mediums which may reside in different locations, e.g., in different computer systems that are connected over a network.

Design information 1215 may be specified using any of various appropriate computer languages, including hardware description languages such as, without limitation:

VHDL, Verilog, SystemC, SystemVerilog, RHDL, M, MyHDL, etc. Design information 1215 may be usable by semiconductor fabrication system 1220 to fabricate at least a portion of integrated circuit 1230. The format of design information 1215 may be recognized by at least one semiconductor fabrication system, such as semiconductor fabrication system 1220, for example. In some embodiments, design information 1215 may include a netlist that specifies elements of a cell library, as well as their connectivity. One or more cell libraries used during logic synthesis of circuits included in integrated circuit 1230 may also be included in design information 1215. Such cell libraries may include information indicative of device or transistor level netlists, mask design data, characterization data, and the like, of cells included in the cell library.

Integrated circuit 1230 may, in various embodiments, include one or more custom macrocells, such as memories, analog or mixed-signal circuits, and the like. In such cases, design information 1215 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1220 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1220 may also be configured to perform various testing of fabricated circuits for correct operation.

In various embodiments, integrated circuit 1230 is configured to operate according to a circuit design specified by design information 1215, which may include performing any of the functionality described herein. For example, integrated circuit 1230 may include any of various elements shown or described herein. Further, integrated circuit 1230 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit.

For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus, comprising:
a plurality of memory ranks including a given memory rank that includes a plurality of memory circuits coupled to a common communication bus; and
a memory control circuit configured to:
receive a plurality of read requests for the plurality of memory ranks, wherein the plurality of read requests includes a first subset of read requests to a first memory rank of the plurality of memory ranks, and a second subset of read requests to a second memory rank of the plurality of memory ranks;
in response to an initiation of a read turn to the plurality of memory ranks, allocate, based on respective numbers of requests in the first subset and the second subset, a first number of slots of a total number of slots for read requests included in the first subset, and a second number of slots of the total number of slots for read requests included in the second subset;
determine, for the read turn, a number of rank switches between the first memory rank and the second memory rank based on at least one quality-of-service requirement associated with the plurality of read requests; and
perform allocated read requests during the read turn using the number of rank switches.

2. The apparatus of claim 1, wherein in the at least one quality-of service requirement includes a real-time bandwidth quality-of-service requirement.

3. The apparatus of claim 2, wherein to determine the number of rank switches, the memory control circuit is further configured to limit the number of rank switches to one, in response to a determination that the real-time bandwidth quality-of-service requirement is not satisfied.

4. The apparatus of claim 2, wherein to determine the number of rank switches, the memory control circuit is further configured to allow more than one rank switch, in response to a determination that the real-time bandwidth quality-of-service requirement is satisfied.

5. The apparatus of claim 1, wherein to perform allocated read requests during the read turn, the memory control circuit is further configured to:
select an initial memory rank of the first memory rank or the second memory rank based on which rank has an oldest low-latency quality-of-service read request pending; and perform the allocated read requests starting with a subset of the allocated read requests associated with the initial memory rank.

6. The apparatus of claim 1, wherein to perform allocated read requests during the read turn, the memory control circuit is further configured to:
select an initial memory rank of the first memory rank and the second memory rank based on which rank has a largest number of low-latency quality-of-service read requests pending; and
perform the allocated read requests starting with a subset of the allocated read requests associated with the initial memory rank.

7. The apparatus of claim 1, wherein to perform allocated read requests during the read turn, the memory control circuit is further configured to:
select an initial memory rank of the first memory rank and the second memory rank based on which rank has a smallest number of low-latency quality-of-service read requests pending; and
perform the allocated read requests starting with a subset of the allocated read requests associated with the initial memory rank.

8. The apparatus of claim 1, wherein the memory control circuit is further configured to insert a given read request of the plurality of read requests into at least one linked list of a plurality of linked lists, wherein a particular linked list of the plurality of linked lists includes a plurality of previously received read requests linked according to respective ages of the plurality of previously received read requests.

9. A method, comprising:
receiving, by a memory control circuit, a plurality of read requests for a plurality of memory ranks including a given memory rank that includes a plurality of memory circuits coupled to a common communication bus, wherein the plurality of read requests includes a first subset of read requests to a first memory rank of the plurality of memory ranks, and a second subset of read requests to a second memory rank of the plurality of memory ranks;
allocating, by the memory control circuit and based on respective numbers of requests in the first subset and the second subset, a first number of slots of a total number of slots for read requests included in the first subset, and a second number of slots of the total number of slots for read request included in the second subset, wherein the total number of slots corresponds to a maximum number of read accesses that can be performed in a read turn; and
determining, by the memory control circuit in response to an initiation of the read turn to the plurality of memory ranks, a number of rank switches between the first memory rank and the second memory rank based on at least one quality-of-service requirement associated with the plurality of read requests.

10. The method of claim 9, wherein in the at least one quality-of service requirement includes a real-time bandwidth quality-of-service requirement.

11. The method of claim 10, wherein determining the number of rank switches includes setting, by the memory control circuit, the number of rank switches to one, in response to determining that the real-time bandwidth quality-of-service requirement is not satisfied.

12. The method of claim 10, wherein determining the number of rank switches includes setting, by the memory control circuit, the number of rank switches to a number greater than one, in response to determining that the real-time bandwidth quality-of-service requirement is satisfied.

13. The method of claim 9, further comprising:
selecting, by the memory control circuit, an initial memory rank of the first memory rank or the second memory rank based on which rank has an oldest low-latency quality-of-service read request pending,
performing a first set allocated read requests associated with the initial memory rank;
in response to completing the first set allocated read requests associated with the initial memory rank, switching to a different memory rank of the first memory rank or the second memory rank; and
performing a second set of allocated read requests associated with the different memory rank.

14. The method of claim 9, further comprising:
selecting, by the memory control circuit, an initial memory rank of the first memory rank or the second memory rank based on which rank has a largest number of low-latency quality-of-service read requests pending,
performing a first set allocated read requests associated with the initial memory rank;
in response to completing the first set of allocated read requests associated with the initial memory rank, switching to a different memory rank of the first memory rank or the second memory rank; and
performing a second set of allocated read requests associated with the different memory rank.

15. The method of claim 9, further comprising:
selecting, by the memory control circuit, an initial memory rank of the first memory rank or the second memory rank based on which rank has a smallest number of low-latency quality-of-service read requests pending,
performing a first set allocated read requests associated with the initial memory rank;
in response to completing the first set of allocated read requests associated with the initial memory rank, switching to a different memory rank of the first memory rank or the second memory rank; and
performing a second set of allocated read requests associated with the different memory rank.

16. The method of claim 9, further comprising inserting, by the memory control circuit, a given read request of the plurality of read requests into at least one linked list of a plurality of linked lists, wherein a particular linked list of the plurality of linked lists includes a plurality of previously received read requests linked according to respective ages of the plurality of previously received read requests.

17. A non-transitory computer-readable storage medium having design information stored thereon, wherein the design information specifies a design of at least a portion of a hardware integrated circuit in format recognized by a semiconductor manufacturing system that is configured to use the design information to produce the hardware integrated circuit according to the design information, wherein the design information specifies that the hardware integrated circuit comprises:
a memory control circuit configured to:
receive a plurality of read requests for a plurality of memory ranks including a given memory rank that includes a plurality of memory circuits coupled to a common communication bus, wherein the plurality of read requests includes a first subset of read requests to a first memory rank of the plurality of memory ranks, and a second subset of read requests to a second memory rank of the plurality of memory ranks;

in response to an initiation of a read turn to the plurality of memory ranks, allocate, based on respective numbers of requests in the first subset and the second subset, a first number of slots of a total number of slots for read requests included in the first subset, and a second number of slots of the total number of slots for read request included in the second subset;

determine, for the read turn, a number of rank switches between the first memory rank and the second memory rank based on at least one quality-of-service requirement associated with the plurality of read requests; and perform allocated read requests during the read turn using the number of rank switches.

18. The non-transitory computer-readable storage medium of claim 17, wherein in the at least one quality-of-service requirement includes a real-time bandwidth quality-of-service requirement.

19. The non-transitory computer-readable storage medium of claim 18, wherein to determine the number of rank switches, the memory control circuit is further configured to set the number of rank switches to one, in response to a determination that the real-time bandwidth quality-of-service requirement is not satisfied.

20. The non-transitory computer-readable storage medium of claim 18, wherein to determine the number of rank switches, the memory control circuit is further configured to set the number of rank switches to a number greater than one, in response to a determination that the real-time bandwidth quality-of-service requirement is satisfied.

* * * * *